United States Patent [19]

Bowman et al.

[11] 4,207,832

[45] Jun. 17, 1980

[54] NOTCHED APPLICATOR WHEEL

[75] Inventors: James L. Bowman, Cincinnati; Terry J. Rowley, Fairfield, both of Ohio

[73] Assignee: Long-Lok Fasteners Corporation, Cincinnati, Ohio

[21] Appl. No.: 970,161

[22] Filed: Dec. 18, 1978

[51] Int. Cl.² ............................................. B05C 1/02
[52] U.S. Cl. ................................ 118/212; 118/216; 118/230; 118/244
[58] Field of Search .......... 118/212, 401, 421, 230, 118/216, 244; 425/403.1

[56] References Cited

U.S. PATENT DOCUMENTS

| | | | |
|---|---|---|---|
| 2,632,918 | 3/1953 | Bergstein | 118/212 X |
| 3,323,492 | 6/1967 | Mellar et al. | 118/401 X |
| 4,046,106 | 9/1977 | Bowman | 118/230 X |

Primary Examiner—John P. McIntosh
Attorney, Agent, or Firm—Smyth, Pavitt, Siegemund, Jones & Martella

[57] ABSTRACT

The present invention is an improvement in a machine described in U.S. Pat. No. 4,046,106 for applying a daub of liquid resin to the threads of a bolt-like fastener. In the unimproved machine the daub was applied by moving the fasteners tangentially to a disc-like applicator wheel. The improvement includes a number of notches in the circumferential edge of the applicator wheel. The fasteners engage the notches with the result that the patch of resin applied extends around the threaded fastener farther in the circumferential direction.

5 Claims, 10 Drawing Figures

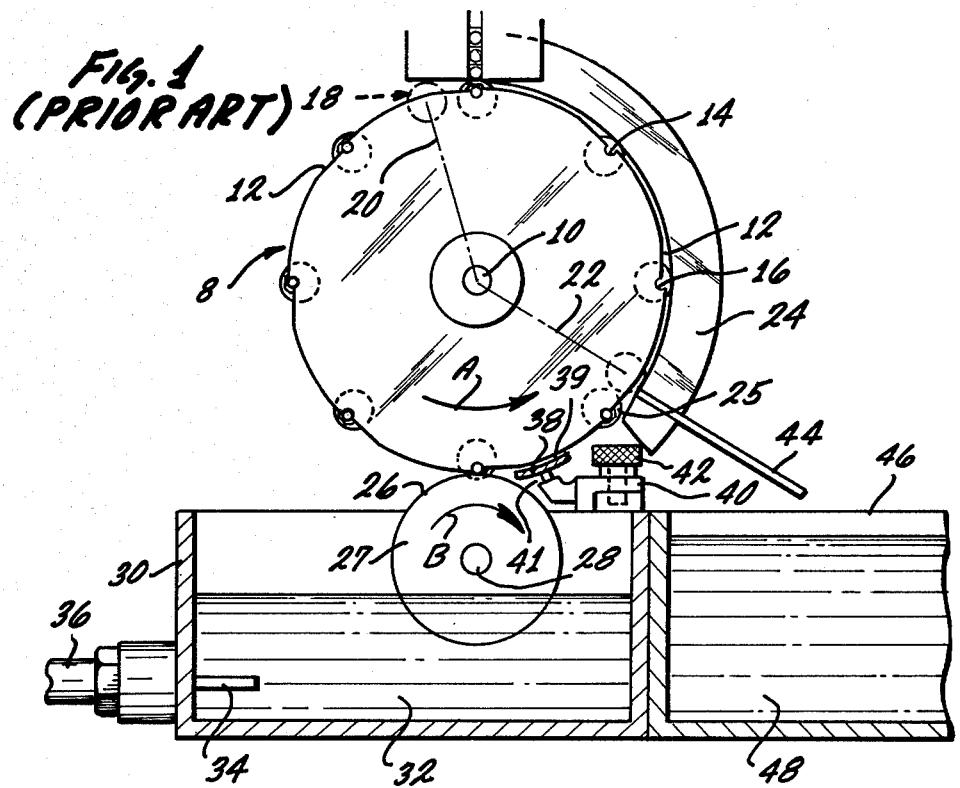
Fig. 1 (PRIOR ART)
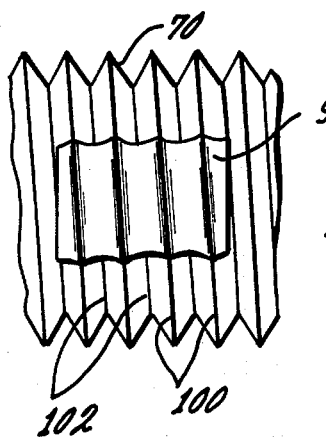
Fig. 5 (PRIOR ART)
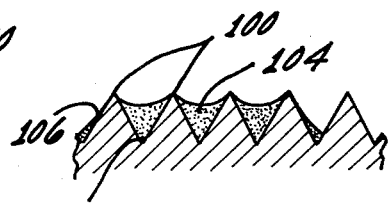
Fig. 4 (PRIOR ART)
Fig. 6 (PRIOR ART)

NOTCHED APPLICATOR WHEEL

BACKGROUND OF THE INVENTION

The present invention is an improvement on the invention disclosed and claimed in U.S. Pat. No. 4,046,106, which was issued to Bowman, Sept. 6, 1977, before the filing of the application on the present invention. The improvement greatly extends the capabilities of the machine disclosed in the aforementioned patent, although the improvement involves only a relatively minor change to one part of the machine. Because the changed part would have no forseeable utility apart from the machine, the description of the machine given in U.S. Pat. No. 4,046,106 will be repeated herein with only such minor alterations as are required to make the description consistent with the improvement. Readers already familiar with the machine will find it expeditious to proceed directly to the portions of the description bearing the headings "Summary of the Invention" and "The Improvement of the Present Invention."

Patch type self-locking fasteners in which a plastic patch is adherently bonded to the threads of the fastener are now being used in a wide variety of applications. For example, patch type fasteners are widely used in the aircraft industry and also the ophthalmic industry.

Patch type fasteners are particularly useful in applications where, through vibration or the application of recurrent forces, there is a tendency for the fastener elements to become unthreaded. Where this occurs, the structural members which are held together by the fastener elements may then become separated. In use applications, such as in an aircraft structure, the separation of structural members could be very harmful.

In a patch type self-locking fastener, one of the fastener elements, such as an externally threaded bolt, has a plastic patch which is adherently bonded to a portion of the screw threads of the bolt. When the bolt is then inserted into a complementary female element, the engagement of the plastic patch with the internal threads of the female element produces an increase in the frictional force between the male and the female elements. When the elements are in threaded engagement, the elements may, then, be subjected to vibrational or otherwise recurring forces without loosening of the threaded engagement between the fastener members. If it is desired to disengage the fastener element, this can be accomplished by applying a torque to the male or female fastener elements with a suitable hand tool. Since the plastic patch is adherently bonded to the threads of the self-locking fastener, the fastener member may be reused a number of times without adversely affecting the bond of the patch to the fastener threads and the performance of the fastener element in providing a firm locking connection with a complementary threaded member.

The Machine Described in U.S. Pat. No. 4,046,106

The machine of U.S. Pat. No. 4,046,106 includes a carrier means for moving a plurality of threaded metal fasteners along an arcuate path. Clamping means, which are associated with the carrier means, clamp the fasteners to the carrier means during the movement of the fasteners along the arcuate path and a movable resin transfer means is positioned adjacent the carrier means with the transfer means having a fastener contact surface. With resin on the contact surface, the transfer means provides movement of the contact surface into contact with the fasteners. With the fasteners moving along an arcuate path past the transfer means, the speed and direction of movement of the contact surface relative to the carrier means during contact between the contact surface and the fastener are controlled to provide an even transfer of resin from the contact surface to a portion of the threads of the fastener to form a plastic patch thereon. The plastic patch deposited on the threads of the fastener is in intimate contact with the roots and flanks of the thread portion that is contacted by the contact surface.

Unclamping means are provided to unclamp or release the threaded fastener from the carrier means after the formation of a plastic patch on the threaded fastener. The fastener is then transported away from the carrier by a conveyor means.

Preferably, the contact surface is moved along an arcuate path by the transfer means with the arcuate path of movement of the contact surface being substantially tangential to the arcuate path of movement of the fasteners during contact of the contact surface with a portion of the threads of the fastener. It is preferable that the contact surface move in the same general direction as the threaded fastener during contact between the contact surface and a portion of the threads of the fastener. Also, it is preferred that the speed of movement of the contact surface be substantially the same as the speed of movement of the threaded fastener during contact between the contact surface and a portion of the threads of the fastener.

The machine of U.S. Pat. No. 4,046,106 may include speed control means to control both the speed and direction of movement of the contact surface. In this manner, the transfer of resin from the contact surface to the threads of the fasteners may be controlled with reference to the movement of the contact surface. Additionally, the apparatus may include heating means which is positioned to heat the threaded fasteners to an elevated temperature prior to contact of the fasteners with the contact surface. This is advantageous when the resin which is placed on the threads of the fasteners is a thermoplastic resin since the heat from the fasteners then serves to maintain the resin in a molten state such that the resin flows into intimate contact with the threads of the fastener.

When the resin which is placed on the fastener threads is a thermoplastic resin, the apparatus preferably includes quenching means which is positioned to receive the threaded fasteners from the conveyor means. Through use of quenching means, the plastic patch may be rapidly cooled. As described in U.S. Pat. No. 3,784,435, the rapid cooling of the patch material may be quite advantageous in reducing the crystallinity of the solidified patch to improve its bond with the threaded fastener and also its toughness. This, thereby, provides patch type fasteners having superior self-locking characteristics.

In the mass production of patch type self-locking fasteners, the apparatus of the invention preferably includes feeder means to feed fasteners to the carrier means. In this manner, a relatively large number of fasteners may be placed in the feeder means with the fasteners then being fed in a sequential manner from the feeder means to the carrier means. Also, the heating means and the feeder means may be incorporated into a single unit. In this manner, the threaded fasteners may then be heated to an elevated temperature within the time required for the fasteners to pass through the feeder means for discharge to the carrier means.

The apparatus of U.S. Pat No. 4,046,106 also includes wiper means which is positioned adjacent the carrier means with the wiper means functioning to wipe the portion of the fastener threads which has been contacted by the resin contact surface and to, thereby, smooth the plastic patch prior to unclamping of the threaded fasteners from the carrier means. When the resin which is transferred to the fastener threads by the contact surface is a thermoplastic, the apparatus preferably includes a hot melt reservoir that is positioned to transfer molten thermoplastic material to the contact surface of the transfer means. The contact surface is then moved, as described, into contact with the threads of the fastener to transfer molten thermoplastic material to the fastener threads in forming a patch thereon.

SUMMARY OF THE PRESENT INVENTION

In contrast to the disk-like transfer wheel having a smooth circular peripheral edge, shown in U.S. Pat. No. 4,046,106, the transfer wheel of the present invention includes at least one outwardly-opening notch in its periphery. The notches are positioned on the transfer wheel in relation to the path of the moving fasteners so that each of the moving fasteners, as it approaches the transfer wheel tangentially, engages one of the notches. The notch partially encircles the threaded shank of the fastener, applying to the fastener a patch of molten resin. The applied patch extends farther around the circumference of the shank of the fastener than the patches applied to fasteners by the smooth-edged transfer wheel shown in U.S. Pat. No. 4,046,106. This wider patch enhances the holding ability of the fastener.

Further, in accordance with the present invention, the width of the applied patch of resin is determined by extent to which the notch partially encircles the threaded shank of the fastener, for a particular transfer wheel. If the notch is relatively deep, the width of the patch may extend around the circumference of the fastener through an angle on the order of 180 degrees. A shallower notch will produce a narrower patch. In the limiting case where the notch is vanishingly small, the transfer wheel and the patches produced become identical with those described in U.S. Pat. No. 4,046,106.

The use of the notched wheel of the present invention reduces the tendency for the resin to build up over the major diameter of the threads of the fastener. Also, the wider patch produced in accordance with the present invention results in a better seal between the male and female members of the fastener.

BRIEF DESCRIPTION OF THE DRAWINGS

In illustrating a preferred embodiment of the invention, reference is made to the accompanying drawings in which:

FIG. 1 is a schematic elevational view, in partial section of a machine of the invention of U.S. Pat. No. 4,046,106 illustrating the manner in which threaded fasteners are brought to the carrier and then moved by the carrier along an arcuate path with resin being transferred from a contact surface to a portion of the fastener threads to form a patch thereon;

FIG. 4 is a plan view of a patch type self-locking fastener illustrating the position of a plastic patch on the fastener threads;

FIG. 5 is an enlarged plan view of the patch and the surrounding threads of the fastener of FIG. 4, and FIG. 6 is a sectional view through the fastener patch taken along the axis of the fastener of FIG. 4 to illustrate the manner in which the patch material is severed into discrete segments by the crests of the fastener threads with the patch material flowing evenly into the thread valleys to form a secure bond with the flanks of the fastener threads;

DETAILED DESCRIPTION OF THE PREFERRED EMBODIMENT

Figure 2:
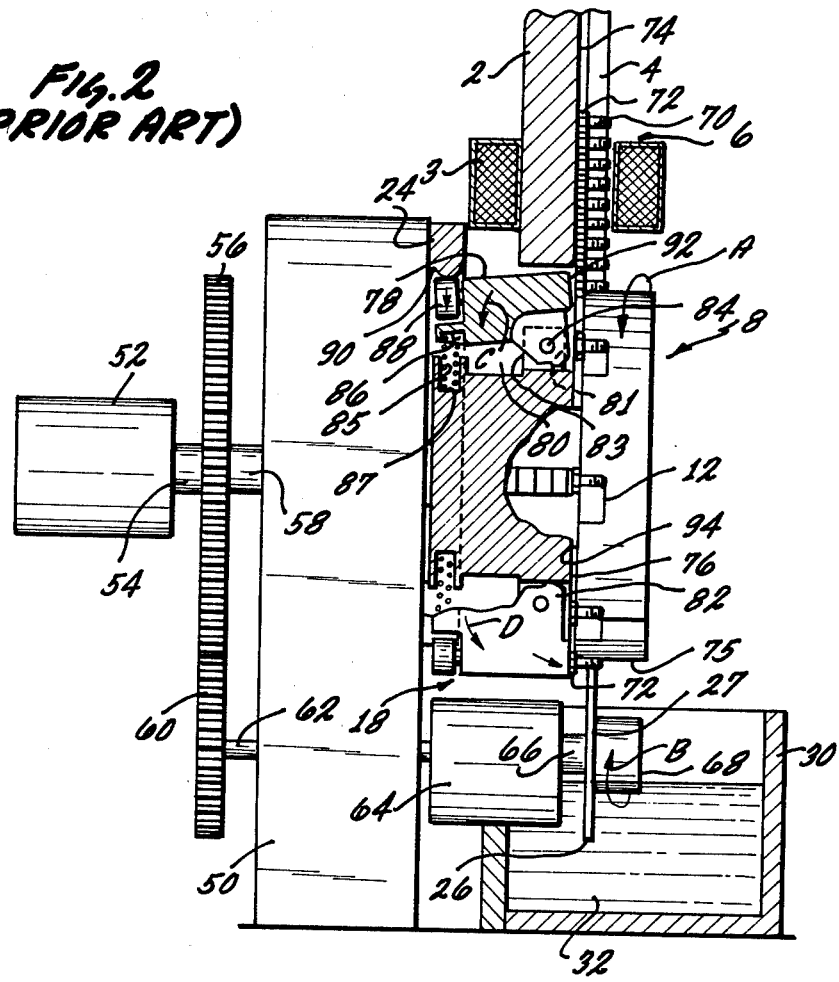
FIG. 2 is a side elevational view, in partial section, of the apparatus of FIG. 1 which illustrates the manner in which threaded fasteners are both clamped and unclamped with respect to the rotatable carrier.

The Machine of U.S. Pat. No. 4,046,106 in Which the Present Invention is Employed Turning to FIG. 1, a feeder 2, which may be heated by an induction coil heater 3, has a feed slot 4. The feed slot 4 contains a plurality of threaded metal fasteners 6 that are fed sequentially from the feeder to a rotatable carrier 8 mounted on a shaft 10. The rotatable carrier 8 includes a plurality of flat areas 12 which are evenly spaced about the exterior surface of the carrier. Interconnected with each of the flat areas 12 are notches 14 in which the fasteners 6 are supported relative to carrier 8. The notches 14 each have a raised shoulder 16 which is positioned away from the intersection of the notch with the adjoining flat area 12.

In operation, as the carrier rotates in the direction of the arrow A, the fasteners 6, as they are fed to the carrier, first encounter one of the flat areas 12. The flat areas 12 are angled slightly inward with respect to the axis of rotation of the carrier 8 which permits the fasteners 6 to contact the flat area and to move gradually downward in dropping into one of the notches 14. After dropping into a notch 14, the fastener 6 is retained in the notch by the shoulder 16 which exerts a side force against the fastener that is directed along the arcuate path of movement of the fastener within the carrier 8.

After dropping into the notch 14, the fastener 6 is securely clamped to the carrier 8 by a clamping mechanism 18 which will subsequently be described in greater detail. As indicated, when the fastener 6 is first received within a notch 14, the fastener is not clamped to the carrier 8. However, after movement of the fastener through a relatively short arcuate distance to a clamping position indicated by line 20, the fastener is then clamped to the carrier 8 and remains clamped to the carrier until the fastener reaches the unclamping position indicated by line 22.

At the unclamping position 22, the clamping mechanism 18 is depressed through contact with a cam 24. The cam 24 includes an inclined surface 25 which first contacts the clamping mechanism 18 to urge the clamping mechanism gradually inward toward the axis of the carrier 8 until the clamping mechanical is fully depressed at unclamping position 22.

As the heated fasteners 6 traverse an arcuate path between the clamping position 20 and the unclamping position 22, a portion of the threads on the fasteners is contacted by a contact surface 26 formed on a transfer wheel 27 which is rotated by a shaft 28. As indicated, the transfer wheel 27 is preferably rotated in the direction of the arrow B which moves the contact surface 26 in the same direction as the fastener 6. Additionally, as shown, movement of the contact surface 26 is substantially tangential to the arcuate part of movement of surface 26 the fasteners 6 during contact between the contact surface 26 and a portion of the fastener threads.

Preferably, the resin which is transferred from contact surface 26 to a portion of the threads of the fasteners 6 is a thermoplastic material which is contained within a hot melt reservoir 30—the molten plastic being indicated as 32. During movement of the transfer wheel 27 in the direction of arrow B as indicated in FIG. 1, the lower portion of the transfer wheel dips into the molten plastic. Due to the viscosity of the molten plastic 32, it adheres to the contact surface 26 and is carried thereby to the threads of a fastener 6.

The quantity of the molten plastic 32 which is picked up by the contact surface 26 will vary in relation to the speed of movement of the transfer wheel 27 through the molten plastic. Thus, within reason by increasing the speed of the transfer wheel 27, the quantity of molten plastic which is picked up by the contact surface 26 may be increased while decreasing the speed of the transfer wheel will decrease the amount of molten plastic which is picked up by the contact surface.

Preferably, the contact surface 26 moves in substantially the same direction and at substantially the same speed as the fastener 6 during the time of contact between the contact surface and a portion of the threads of the fastener. By controlling the speed and direction of movement of the contact surface 26 relative to the threads of the fastener 6 in this manner, the patches which are formed on the threads of the fasteners may be more uniform in their characteristics to provide patch type fasteners which have more uniform properties.

In maintaining the molten plastic 32 at a desired temperature within reservoir 30, a heater element 34 may be imbedded into the body of the molten plastic reservoir bottom with the heater element receiving electrical energy through a conductor 36. Preferably, the molten plastic 32 is a thermoplastic polyester such as a terephthalate polyester since thermoplastic materials of this type have been found admirably suited for the information of patch type self-locking fasteners. By way of example, if the molten plastic 32 is a thermoplastic polyester, the plastic may be maintained at a temperature of about 500° F. However, the temperature of the molten plastic 32 may be varied depending upon the nature of the particular plastic and its melting point.

After transfer of the resin from the contact surface 26 to a portion of the threads of one of the fasteners 6, the resin on the fastener threads may be wiped through contact with a wiper element 38 which is positioned closely adjacent to the arcuate path of movement of the fasteners by the rotatable carrier 8. As indicated, the wiper element 38 may include an arcuate surface 39 with a shape which approximates the arcuate path of movement of the fasteners 6 by rotatable carrier 8. This, then provides wiping of the resin that is deposited on a portion of the threads of the fastener 6 with the wiping resulting in the formation of a more uniform patch on the fastener threads.

The wiper element 38 may be connected to a support element 40 which is fixed in a given position by an adjustment screw 42. The support element 40 may include a spring element 41 to position the wiper element 38 with respect to the path of movement of the fasteners 6. Through use of the spring element 41, the wiper element 38 is yieldably positioned such that the wiper element may be displaced to prevent its breakage if one of the fasteners 6 is mispositioned to make jamming contact with the wiper element. By loosening of the adjustment screw 42, the support element 40 and wiper element 38 may be moved to a new position. This may be done, for example, when a changeover is being made for the production of patch type fasteners of a longer length. Fasteners of greater or less diameter are handled by changing wheel 8 so that diameter of the arcuate path taken at the outside of the fastener always remains constant and therefore the contact path with wheel 27 remains constant.

After smoothing of the resin of the threads of the fasteners 6 through contact with the wiper element 38, the fasteners are then unclamped, as described previously, through contact of the clamping mechanism 18 with the cam 24 at the unclamping position 22. Following this, the fasteners 6 may be released from the rotatable carrier 8 onto a transfer chute 44 that conveys the heated fasteners to a quench tank 46 which contains a quench liquid 48. A preferred quench liquid is water. However, a silicone liquid which is cooled to a very low temperature (such as with dry ice) may be used as a quench liquid if it is desired to cool the heated fasteners at a more rapid rate. By quenching of the heated fasteners, as described previously, the molten resin on the threads of the fastener may be solidified at a more rapid rate. This may result in a marked reduction in the degree of crystallization of the hardened patch material with the result that the patch material is more tenaciously bonded to the threads of the fastener and is also tougher than a highly crystalline plastic.

After release of the fasteners 6 from the carrier 8 at unclamping position 22, the clamping mechanism 18 may be maintained in a depressed condition through contact with the cam 24 during rotation of the carrier to move the empty notch 14 to the feeder 2 for receipt of a new fastener 6. As illustrated, the cam 24 may have an arcuate surface whose shape is complementary to the arcuate path of movement of the clamping mechanism 18 during movement of the rotatable carrier 8. The surface of the cam 24, thus, maintains the clamping mechanism 18 in a depressed condition during movement of the carrier 8 from the unclamping position 22 to the clamping position 20 with the clamping mechanism 18 then being free from contact with cam 24 to clamp a new fastener 6 within the notch 14.

As shown in FIG. 2, which is a side view of the apparatus of FIG. 1 in partial section, the rotatable carrier 8 and the transfer wheel 27 may be positioned relative to each other by a support structure 50 with the rotatable carrier and transfer wheel being driven by a drive motor 52. The drive motor 52 actuates a drive shaft 54 which is connected to a gear 56. The gear 56 is connected to an output shaft 58 and meshes with a gear 60 having an output shaft 62. The output shaft 62 is connected through a speed changer 64 to an output shaft 66 which is connected to the transfer wheel 27. A retainer member 68 may be positioned on the exterior surface of the transfer wheel 27, i.e., opposite to the side which is connected to shaft 66, with the retainer member functioning to hold the transfer wheel on the output shaft 66. Through use of the speed changer 64, the speed and direction of movement of the transfer wheel 27 may be varied with respect to the speed and direction of movement of the rotatable carrier 8. In this manner, the quantity of resin 32 which is carried by contact surface 26 to the threads of a fastener 6 may be varied in relation to the speed and movement of the transfer wheel 27.

The fasteners 6, as shown within the feeder 2, each have a threaded shank 70 and an enlarged head 72 with the threaded shank extending into the feed slot 4. The enlarged heads 72 extend laterally on either side of the fastener into transverse slots 74 which are positioned at right angles to the feed slot 4. The feed slot 5 together with the transverse slots 74 form an opening within the feeder 2 which has a T-shaped configuration.

As retained within feeder 2, the threaded fasteners 6 may be fed downwardly while being heated within the feeder by the induction heater 3. As shown in FIG. 1, the fasteners 6, upon leaving the open lower end of feeder 2, encounter the exterior surface 75 of rotatable carrier 8. As a fastener 6 drops from the feeder 2 against the rotatable carrier 8, the fastener shank 70 is supported on the exterior carrier surface 75 while the fastener head 72 extends into a circumferential groove 76 formed on the exterior carrier surface.

The clamping mechanism 18, through which the fasteners 6 are clamped to the rotatable carrier 8, includes a clamping member 78 mounted within a cavity 80 in the rotatable carrier. A support ear 81 within the cavity 80 is engaged by a pair of fork members 82 on the clamping member 78. The support ear 81 extends into a slot 83 between the fork members 82 with a pivot pin 84 passing through aligned apertures in the fork members and a corresponding aperture in the support ear. In this manner, the clamping member 78 is rotatably positioned within the cavity 80.

The outer end of the biasing spring 85 is retained in a spring well 86 formed on the underside of a clamping member 78 while the inner end of the biasing spring is retained within a spring well 87 formed in the body of the rotatable carrier 8. A rotatable cam follower 88 which is mounted on the clamping member 78 engages a cam surface 90 formed on the cam 24 in movement of the clamping member to an unclamped position indicated by the arrow C. During movement of the clamping member 78 in the direction of arrow C, a clamping surface 92 is moved away from the outer face of the fastener head 72. However, then the cam follower 88 is not engaged with cam surface 90, the clamping member 78 rotates in the direction of the arrow D under the influence of the biasing spring 85. This causes the clamping surface 92 on clamping member 78 to move into contact with the fastener head 72 with the head being clamped between clamping surface 94 which is formed by the wall of the circumferential groove 76.

Figure 3:
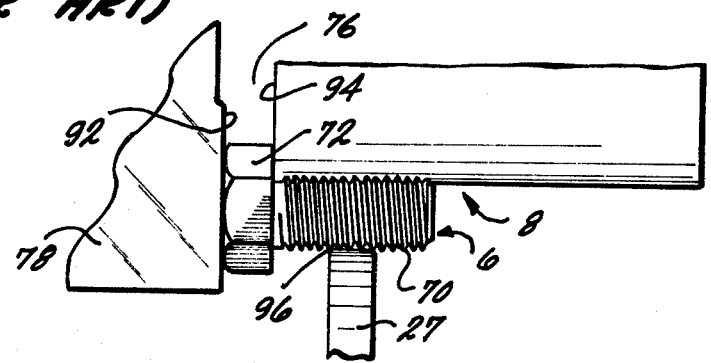
FIG. 3 is an enlarged elevational detail view illustrating the threaded fastener with the fastener head being clamped to the rotatable carrier and the threads of the fastener being contacted by the contact surface of the transfer means to transfer resin to a portion of the fastener threads.

FIG. 3 is an enlarged detail view of one of the fastener 6 positioned on the rotatable carrier 8, with the fastener head 72 clamped to the rotatable carrier. The fastener head 72, as shown, is clamped between clamping surface 94 defined by the circumferential groove 76 and the clamping surface 92 formed on the clamping member 78. With the fastener 6, thus, held in a clamped position, a plastic layer 96 is applied to a portion of the threads of the fastener through contact of the transfer wheel 27 with the fastener threads.

FIG. 4 is a plan view of a patch type fastener which illustrates the position of a plastic patch 98 that is adherently bonded to the threaded shank 70 of fastener 6. The plastic patch 98 is positioned in substantial axial alignment with the axis of the fastener 6 with the patch having a width which subtends an arc that is less than about 180° with respect to the circumference of the fastener. Further, the patch 98 has a length which covers at least about three threads of the fastener 6 and the patch is positioned a substantial distance away from the end 99 of fastener shank 70. Thus, when the fastener 6 is threaded into a complementary female member, the threads at the end of the fastener shank 70 are firmly engaged with the internal threads of the complementary member before engagement of the complementary member with that portion of the shank which has the patch 98 adhered thereto.

On the insertion of the patch 98 into the female member, the presence of the patch exerts a side force against the fastener shank 70 that urges the thread portions positioned opposite on the shank to the position of the patch into camming engagement with the internal threads of the female member. This produces a self-locking action between the fastener 6 and the complementary female member which prevents the fastener from becoming unthreaded as a result of vibration or from a recurring force. The fastener 6, thus, remains firmly engaged in a threaded relation with the female member until such time as a torque is applied to unthread the fastener. The torque which is required to unthread the fastener 6 is termed the breakaway torque and it is one of the fastener characteristics that may be specified in the purchase of patch type fasteners. The present apparatus produces self-locking patch type fasteners whose characteristics are relatively uniform and, having in particular, a relatively uniform breakaway torque.

FIG. 5 is an enlarged plan view of the patch 98 showing its configuration with respect to the threads of the fastener shank 70. The threads of the fastener shank 70 includes crests 100 and grooves 102. As illustrated, the material forming the patch 98 is adherently bonded to the threads of the fastener shank 70 with the material in intimate contact with the grooves 102 to form a secure bond to the fastener threads.

FIG. 6 is a side sectional view of the patch 98 of FIG. 5 and illustrates the manner in which the plastic patch 98 may be separated into discrete segments of pools 104 through contact with the heated crests 100 when the patch material is a thermoplastic. As shown, the individual segments or pools of plastic material 104 flow evenly into the the fastener threads to bond securely to the thread flanks 106 and also the grooves 102 of the fastener threads. By flowing into intimate contact with all portions of the fastener threads, the plastic patch 98 forms an adherent bond with the threads that is relatively independent of surface imperfections in the threads. This is quite advantageous since patch type fasteners which are formed by forcing a plastic material into the threads of the fastener by a punch may not form an adherent bond with the fastener threads in those areas where there are surface imperfections since the flow of the patch material is insufficient for the patch material to enter into the imperfections.

As illustrated in FIGS. 4-6, the positioning of the plastic patch 98 with respect to fastener 6 and also the shape of the patch and its external dimensions are reproducible in the use of the present apparatus. It is necessary that the patch type fasteners have uniform characteristics such that they will perform uniformly in service. By maintaining uniformity as to the size and position of the fastener patch 98 relative to the fastener 6, the patch type fasteners produced by the present apparatus have the necessary uniform characteristics as required for uniform performance of the fasteners.

The Improvement of the Present Invention

Figure 7:
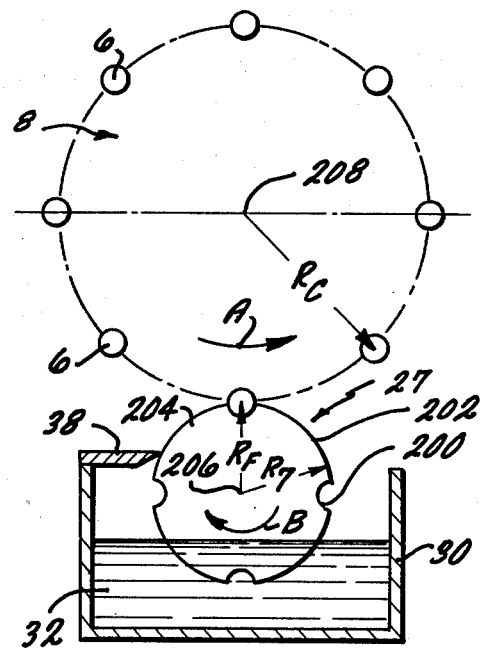
FIG. 7 is a diagram showing a schematic elevational view, partially in section, of a patch-applying machine employing a notched transfer wheel in accordance with a preferred embodiment of the present invention.
Figure 9:
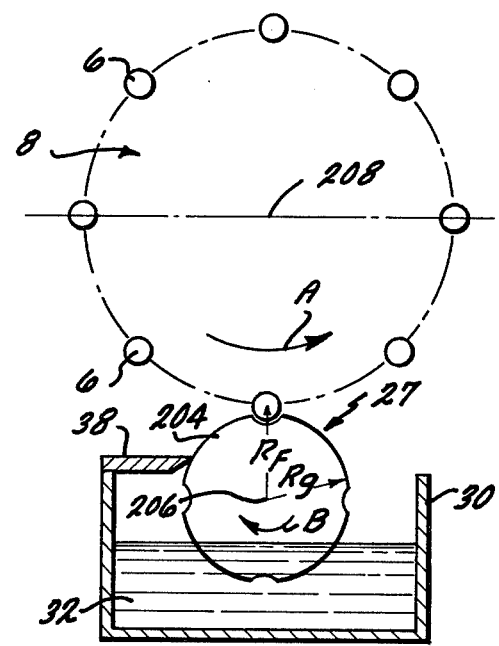
FIG. 9 is a diagram showing a schematic elevational view, partially in section, of a patch-applying machine employing a notched transfer wheel in accordance with an alternative embodiment of the present invention; and, FIG. 10 is a plan view of a patch type self-locking fastener illustrating the plastic patch applied to the threads by the machine of FIG. 8.

The improvement which constitutes the present invention is shown and explained in FIGS. 7-10. FIGS. 7 and 9 are diagrammatic and differ only in the radius ($R_7$ or $R_9$) of the transfer wheel 27, the distance $R_F$ being the same in FIG. 7 and FIG. 9.

The diagrams of FIGS. 7 and 9 represent machines identical to the machine shown in FIG. 1 and 2, with the exception of an alteration to the transfer wheel 27. The improved transfer wheel of the present invention is shown in FIGS. 7 and 9. Thus, in FIGS. 7 and 9 one or more fasteners 6 are mounted on the carrier 8 which rotates about the carrier axis 208 in the direction indicated by the arrow A. The transfer wheel 27 rotates about the transfer wheel axis 206, and includes a periphery or outer portion 204 which is bounded by an edge 202. The transfer wheel is rotated in the direction of the arrow B, and the same means is used to synchronize the rotation of the transfer wheel 27 with the carrier 8 as was used in the invention shown in FIGS. 1 and 2.

Consistent with the present invention, the transfer wheel 27 includes at least one notch 200 in its edge. The relative speeds of rotation of the carrier 8 and the transfer wheel 27 are selected and maintained at values which assure that a notch and the fastener which engages it are moving at the same speed while they are engaged.

It is also clear that the circumferential distance between successive fastener stations on the carrier 8 must be an integer multiple of the circumferential distance between successive notches on the transfer wheel 27. The notches of the transfer wheel of FIG. 9 are congruent with the notches of the transfer wheel of FIG. 7, but the radius $R_9$ of the transfer wheel of FIG. 9 is less than the radius $R_7$ of the transfer wheel of FIG. 7, at least in the region immediately adjacent the notches.

Figure 8:
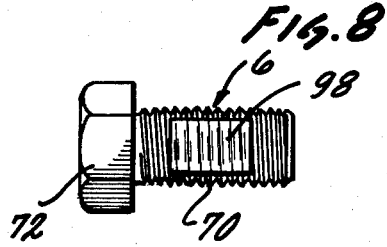
FIG. 8 is a plan view of a patch type self-locking fastener illustrating the plastic patch applied to the threads by the machine of FIG. 7.
Figure 10:
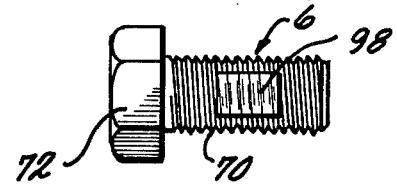

As the carrier 8 rotates, a fastener which is in engagement with the transfer wheel rotates slightly with respect to notch, tending to produce a wider patch 98. However, the increased patch width is mainly due to the increased area of contact between the fastener and the surface of the notch. Thus, where there is a large contact area as in FIG. 7, a wide patch is produced as shown in FIG. 8. In contrast, in FIG. 9 the contact area is less, and the resulting patch 98 of FIG. 10 is narrower. Continuing in this same sequence, if the area of contact is minimal, as is the case in FIG. 1, the width of the resulting patch will also be minimal, as shown in FIG. 4. Thus, by properly selecting the radius of the transfer wheel 27, patches of predetermined width can be produced. Thus, the breakaway torque of the fasteners can be predetermined.

Experience to date with the improved transfer wheel demonstrates that it reduces the tendency for the patch material to build up over the major diameter of the thread. Also, the wider patch produced by the improved transfer wheel produces a better seal between the male and female members of the fastener.

The foregoing is illustrative of one embodiment of the invention, and it is to be understood that additional embodiments thereof will be obvious to those skilled in the art. The embodiment described herein together with those additional embodiments are considered to be within the scope of the invention.

What is claimed is:

1. In an apparatus for applying a patch of molten plastic to the threads of a fastener, said apparatus including a rotating transfer wheel, a portion of the edge of which is immersed in a reservoir of molten plastic, and including a moving carrier wheel rotating about an axis parallel to the axis of rotation of the transfer wheel and on which the fasteners are mounted substantially parallel to the axis of rotation of the transfer wheel, the carrier wheel moving the fasteners in a continuous motion tangentially contacting the circumferential edge of the rotating transfer wheel so that a patch of the molten plastic is transferred from the edge of the transfer wheel to the threads of the fastener, the improvement comprising:

a region of the periphery of the transfer wheel defining a notch extending axially through the edge of the transfer wheel, the notch being large enough to permit the threaded portion of the fastener to seat into the notch as the fastener is moved past the edge of the transfer wheel and deep enough to extend around the threaded portion of the fastener to a chosen extent.

2. The improvement of claim 1 wherein the radius of the circumferential edge of the rotating transfer wheel is preselected to produce a patch of a desired size of molten plastic on the fastener, the radial location of the notch being independent of the preselected radius in accordance with the kinematics of the movement.

3. The improvement of claim 1 wherein the carrier wheel carries a fastener on an arcuate path in a continuous motion engaging the edge of the transfer wheel tangentially, and wherein the rotational speeds and positions of the carrier wheel and of the transfer wheel are maintained in such a relationship that as the fastener passes tangentially by the transfer wheel, the notch registers with the fastener and the fastener engages the notch.

4. The improvement of claim 3 wherein more than one fastener are carried by the carrier wheel.

5. The improvement of claim 3 wherein the edge of the transfer wheel includes more than one identical notches spaced around the circumference of the transfer wheel.

* * * * *